United States Patent
Buckner

(10) Patent No.: US 12,512,901 B2
(45) Date of Patent: Dec. 30, 2025

(54) D-ATIS COLLECTION AND DISSEMINATION SYSTEMS AND METHODS

(71) Applicant: Honeywell International Inc., Charlotte, NC (US)

(72) Inventor: James Buckner, Braselton, GA (US)

(73) Assignee: Honeywell International Inc., Charlotte, NC (US)

( * ) Notice: Subject to any disclaimer, the term of this patent is extended or adjusted under 35 U.S.C. 154(b) by 234 days.

(21) Appl. No.: 18/169,137

(22) Filed: Feb. 14, 2023

(65) Prior Publication Data

US 2024/0275469 A1 Aug. 15, 2024

(51) Int. Cl.
- *H04B 7/185* (2006.01)
- *G08G 5/26* (2025.01)
- *G08G 5/34* (2025.01)

(52) U.S. Cl.
CPC ............ *H04B 7/18508* (2013.01); *G08G 5/26* (2025.01); *G08G 5/34* (2025.01)

(58) Field of Classification Search
CPC . H04B 7/18508; G08G 5/0013; G08G 5/0039
See application file for complete search history.

(56) References Cited

U.S. PATENT DOCUMENTS

| | | | |
|---|---|---|---|
| 9,256,004 B2 | 2/2016 | Agarwal et al. | |
| 10,878,705 B1 * | 12/2020 | Morowsky | G08G 5/0021 |
| 2004/0106404 A1 * | 6/2004 | Gould | G06F 8/60 |
| | | | 455/431 |
| 2008/0243319 A1 * | 10/2008 | Coulmeau | G01C 23/00 |
| | | | 701/14 |
| 2013/0267186 A1 * | 10/2013 | Agarwal | G01W 1/10 |
| | | | 455/91 |
| 2016/0316481 A1 * | 10/2016 | Barailler | H04B 7/18506 |
| 2020/0145829 A1 * | 5/2020 | Rule | H04L 63/10 |

(Continued)

FOREIGN PATENT DOCUMENTS

| | | |
|---|---|---|
| CN | 103729536 B | 5/2018 |
| CN | 106066649 B | 6/2021 |

(Continued)

OTHER PUBLICATIONS

FR-3009759-A1 English Translation (Year: 2024).*

(Continued)

*Primary Examiner* — Erin M Piateski
*Assistant Examiner* — Gabriel Joseph Rene Lambert
(74) *Attorney, Agent, or Firm* — Fogg & Powers LLC

(57) ABSTRACT

Systems and methods for collecting and disseminating D-ATIS data to one or more entities are included. To collect D-ATIS information, one or more collection systems send requests to one or more ground stations. Each collection system can be located remotely from the ground station it requests D-ATIS information from. When a collection system receives D-ATIS information, it is configured to send the D-ATIS information to a central processing system. The central processing system is configured to manage a database that stores D-ATIS parameters determined from the D-ATIS information. In response to a request by a vehicle or other user to receive D-ATIS parameters for a ground station, the central processing system is configured to send the D-ATIS parameters to the vehicle or other user.

17 Claims, 5 Drawing Sheets

(56) References Cited

U.S. PATENT DOCUMENTS

| | | | |
|---|---|---|---|
| 2020/0225831 A1 | 7/2020 | Saptharishi et al. | |
| 2022/0201474 A1* | 6/2022 | Raman | H04L 63/10 |
| 2023/0138511 A1* | 5/2023 | Hamilton | G08G 5/0013 |
| 2023/0246706 A1* | 8/2023 | Bonnet | H04B 7/18506 |
| | | | 370/316 |
| 2023/0280187 A1* | 9/2023 | Thierbach | G01C 23/00 |
| | | | 701/532 |

FOREIGN PATENT DOCUMENTS

| | | | | |
|---|---|---|---|---|
| EP | 3789986 A1 | | 3/2021 | |
| FR | 3009759 A1 | * | 2/2015 | G08G 5/0013 |
| JP | H-1125400 A | * | 1/1999 | G08G 5/00 |

OTHER PUBLICATIONS

JPH-1125400A English Translation (Year: 2024).*
Kulkarni et al., "Aviation Data Integration System", NASA Ames Research Center, Jun. 25, 2003, pp. 1 through 12, retrieved from https://ntrs.nasa.gov/api/citations/20030065976/downloads/20030065976.pdf.
European Patent Office, "Extended European Search Report", dated Jun. 6, 2024, from EP Application No. 24153156.5, from Foreign Counterpart to U.S. Appl. No. 18/169,137, pp. 1 through 7, Published: EP.

\* cited by examiner

D-ATIS COLLECTION AND DISSEMINATION SYSTEMS AND METHODS

BACKGROUND

Automatic Terminal Information Service (ATIS) is a service in which essential aeronautical information is conveyed to aerial vehicles such as aircraft during navigation. ATIS information typically includes information vital for aircraft navigation in and out of busy airports, such as weather and airport information (runways in use, altimeter readings, wind direction and speed, temperature, and dew point, etc.), and other information for aircraft navigation within the vicinity of the airport. Although ATIS information is usually utilized for an aircraft when landing or taking off at the specific airport, ATIS information can be useful in other contexts of aircraft navigation, such as for preemptive navigation planning.

An airport tower periodically broadcasts ATIS information to aircraft that are within the range of the airport tower broadcast for ATIS. Current industry standards require that an aircraft communicating with the air traffic control (ATC) tower be aware of the most recently broadcast ATIS report. If an aircraft communicating with the ATC tower does not have the most up to date ATIS information, the ATC tower will then communicate the most current ATIS information to the vehicle.

ATC towers traditionally broadcast ATIS information via broadcast audio transmission, which requires the aircraft to come within range of the tower's broadcasting station to receive the ATIS information. Some ATC towers now provide ATIS reports to aircraft in response to a request from the aircraft; these reports are transmitted via messaging protocols known as Aircraft Communication and Address Reporting Systems (ACARS) and displayed as a text message on an avionics device of the aircraft. Such ATIS transmission is referred to as Digital ATIS, or D-ATIS.

An aircraft may rely significantly on ATIS information when preparing to navigate a flight path. If the ATIS information indicates that changes to the planned flight path, e.g., arrival and/or departure procedure, runways in use, and inclement weather or traffic conditions, it may not be able to modify its flight plan or prepare accordingly until the aircraft is actually in range and receives the ATIS report.

D-ATIS information can be requested from the aircraft avionics device via an ACARS network. Even then, the aircraft would only have access to the D-ATIS information that corresponds to that particular airport station, and if the aircraft wanted D-ATIS information for multiple stations, it would need to additionally request each airport station separately for that D-ATIS information. Since ATIS information is updated regularly by each station, the aircraft would need to continuously send requests to multiple stations to have access to the most up-to-date ATIS information. Doing so would, at a minimum, substantially increase the message flow and processing output for the aircraft.

Additionally, other interested parties interested in receiving D-ATIS information for a particular airport station may not have access to the D-ATIS information since aircraft ACARS communications are the only means of requested D-ATIS.

Accordingly, there is a need for easy accessibility to D-ATIS reports, both in the context of safe aircraft navigation and in navigation planning more generally.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a method is disclosed. The method comprises receiving a request for Digital Automatic Terminal Information Service (D-ATIS) information that corresponds to at least one ground station. The method comprises retrieving, from a database managed by a central processing system, one or more stored D-ATIS parameters that correspond to the at least one ground station. The central processing system is configured to store D-ATIS parameters corresponding to a plurality of ground stations. The method comprises generating a D-ATIS report that includes the D-ATIS parameters that correspond to the at least one ground station. The method comprises sending the D-ATIS report to a vehicle or other user that generated the request.

In another embodiment, a system is disclosed. The system comprises a central processing system comprising at least one processor and a memory. The central processing system is configured to manage a database storing Digital Automated Terminal Information Service (D-ATIS) parameters that correspond to a plurality of ground stations. The central processing system is configured to receive a request for D-ATIS information that corresponds to at least one ground station from at least one vehicle or other user communicatively coupled to the central processing system. The central processing system is configured to retrieve one or more of the stored D-ATIS parameters that correspond to the at least one ground station. The central processing system is configured to generate a D-ATIS report that includes the D-ATIS parameters that correspond to the at least one ground station. The central processing system is configured to send the D-ATIS report to the at least one vehicle or other user that sent the request.

In yet another embodiment, a program product is disclosed. The program product comprises a non-transitory processor-readable medium on which program instructions configured to be executed by at least one processor are embodied. When executed by the at least one processor, the program instructions cause the at least one processor to receive a request for Digital Automatic Terminal Information Service (D-ATIS) information that corresponds to at least one ground station. The program instructions further cause the at least one processor to retrieve, from a database managed by a central processing system, one or more stored D-ATIS parameters that correspond to the at least one ground station. The program instructions further cause the at least one processor to store D-ATIS parameters corresponding to a plurality of ground stations. The program instructions further cause the at least one processor to generate a D-ATIS report that includes the D-ATIS parameters that correspond to the at least one ground station. The program instructions further cause the at least one processor to send the D-ATIS report to a vehicle or other user that generated the request.

Systems and methods for collecting D-ATIS information from multiple ground stations are also disclosed.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as further described in the context of the detailed description.

Figure 1:
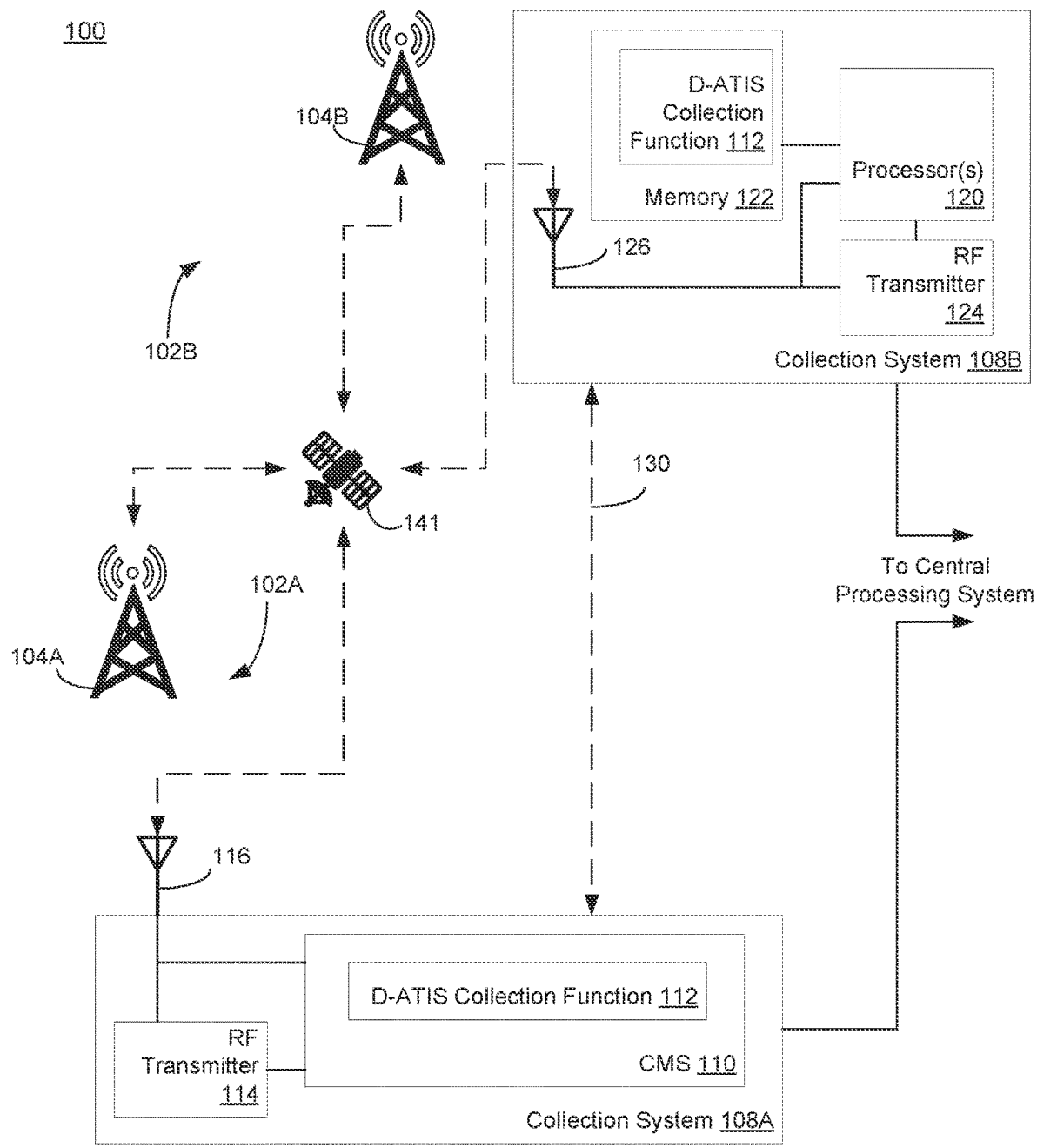
FIG. 1 depicts a block diagram of an exemplary system configured to collect D-ATIS information for a plurality of ground stations, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification is not to be construed as limiting the order in which the individual steps may be performed. The following detailed description is, therefore, not to be taken in a limiting sense.

The embodiments described herein provide for a D-ATIS database that can be accessible to multiple vehicles or users in a communication network regardless of how proximate they are to a ground station. In doing so, a vehicle operator or user can access up-to-date D-ATIS information for any given ground station without having to repeatedly contact the ground station each time for updated D-ATIS information. Having ready access to D-ATIS information for a wide selection of ground stations improves vehicle navigation, for example, because it allows an operator to have earlier awareness of D-ATIS information when navigating the vehicle. If an operator intends to submit a flight modification request, for example, the flight modification request is more likely to be approved by the ground station if the operator already knows the landing sites that are available or scheduled times/departures of other vehicles utilizing the ground station.

FIG. 1 depicts a block diagram of an exemplary system 100 configured to collect D-ATIS information for a plurality of ground stations 104A, 104B. Each ground station 104A, 104B can be located in a different geographical region 102A, 102B. System 100 also includes a plurality of collection systems 108A, 108B, that can be located both remotely to each other and to the ground stations 104A, 104B. The system 100 can form part of a communication network in which the plurality of collection systems 108A, 108B communicate with a central processing system (not shown in FIG. 1) and optionally to each other and/or to a plurality of vehicles (not shown in FIG. 1), as subsequently described and in the context of FIG. 2. Although only two such collection systems are shown in FIG. 1, system 100 can include many more collection systems.

Each collection system 108A, 108B is deployed in a physical location to collect D-ATIS information for one or more of the ground stations 104A, 104B. In some embodiments, a collection system is permanently deployed, for example, by being affixed to a structure or terrestrial location, such as a building. In other embodiments, a collection system can be deployed by mounting the collection system on a mobile platform.

Each collection system 108A, 108B includes electronics and circuitry configured for collecting D-ATIS information for at least one of the ground stations 104A, 104B that corresponds to the collection system. As shown in FIG. 1, collection system 108B includes one or more processors 120 electrically coupled to a radio frequency (RF) transmitter 124 and to a memory 122. Memory 122 can be embodied as a storage medium or other memory circuitry that stores a D-ATIS collection function 112 as further described herein. Collection system 108B also includes an antenna 126 electrically coupled to the RF transmitter 124. Similar to collection system 108B, collection system 108A includes an RF transmitter 114 coupled to antenna 116. Instead of a generic processing system 120, collection system 108A includes a communications management system (CMS) that is configured to manage communications received from ground station 104A and one or more datalink devices communicatively coupled to CMS 110 (not shown in FIG. 1). CMS 110 can be implemented as a communication management unit (CMU); alternatively, CMS 110 is implemented as a communication management function (CMF) executed on one or more processors.

To collect D-ATIS information, each collection system 108A, 108B emulates an aircraft that would conventionally be seeking to acquire D-ATIS reports for navigation, landing, or other purpose. That is, the collection systems 108A, 108B are configured to simulate a navigating aircraft requesting D-ATIS information from the perspective of the ground stations 104A, 104B. As shown in FIG. 1, each collection system 108A, 108B includes a D-ATIS collection function 112 stored in a storage medium (e.g., in memory 122 or CMS 110). D-ATIS collection function 112 includes processor-readable instructions that, when executed by at least one processor, cause the at least one processor to collect D-ATIS information for one or more of the ground stations 104A, 104B. In some embodiments, D-ATIS collection function 112 causes the collection system 108A, 108B to automatically collect D-ATIS information at periodic intervals so that a party (e.g., an operator in a navigating aircraft) does not need to be physically present in the range of the ground stations 104A, 104B to receive D-ATIS information.

In the embodiment shown in FIG. 1, CMS 110 is configured, by the instructions of D-ATIS collection function 112, to generate a D-ATIS request message for D-ATIS information. CMS 110 then configures RF transmitter 114 to generate an RF signal that includes the D-ATIS request message. RF transmitter 114 provides the RF signal to antenna 116, which radiates a signal that includes the D-ATIS request message to ground station 104A. In some embodiments, the transmission of a D-ATIS request message can be sent via a satellite communications (SATCOM) communications link, which is received by satellite(s) 141 and provided to the target ground station. Other RF communication links can be used, for example, if the collection system is within range to a target ground station. In some embodiments, the D-ATIS request message takes the form of an ACARS downlink message to the ground station 104A in a format that the ground station 104A would conventionally receive by a traversing aerial vehicle that is communicating with the ground station 104A.

Ground station 104A receives the D-ATIS request message and sends a response message (e.g., to satellite(s) 141) that includes the D-ATIS information generated by the ground station to collection system 108A. The response message is received at antenna 116, and is subsequently provided to CMS 110. CMS 110 processes the message and determines one or more D-ATIS parameters from the extracted information in the message. CMS 110 is then configured to send the determined D-ATIS parameters to a central processing system (see FIG. 2) for storage in a database, where the D-ATIS parameters can be subsequently accessed by users regardless of their physical proximity to ground station 104A and geographical location 102A.

Collection system 108B functions similarly as described for collection system 108A. Processor 120 is configured to generate a D-ATIS request message for D-ATIS information generated by ground station 104B. Processor 120 configures RF transmitter 124 to generate an RF signal with the D-ATIS request message. Antenna 126 radiates the RF signal to ground station 104B (e.g., via satellite(s) 141), and subsequently receives a response message from ground station 104B that includes the D-ATIS information. Antenna 126 then provides the response message to processor 120, and processor 120 then processes the message to determine one or more D-ATIS parameters. Processor 120 sends a message (see FIG. 2) to a central processing system with the D-ATIS parameters. The D-ATIS parameters are the extracted and processed D-ATIS information acquired from the D-ATIS reports.

The collection of D-ATIS information by the collection systems 108A, 108B can also be triggered periodically for a set time interval. After a designated time period has elapsed, collection systems 108A, 108B can repeat the above processes for requesting D-ATIS information from their associated ground stations 104A, 104B. Each collection system 108A, 108B then sends each of the updated D-ATIS parameters to the central processing system. Doing so enables D-ATIS parameters corresponding to each ground station 104A, 104B to be periodically updated to account for subsequent changes in D-ATIS information. For example, weather information may significantly change from one time period to the next. Additionally, the timing of the collection periodicity can be adjusted based on weather and/or other potential hazard conditions reported by an associated ground station. For example, if the D-ATIS parameters determined for ground station 104B indicate that inclement weather such as a snowstorm is approaching, processor 120 can adjust the frequency of D-ATIS information collection to a higher frequency so that the inclement weather (or other hazard condition) can be more frequently monitored. A weather application or other data source can be used to adjust the periodicity of D-ATIS information collection.

The collection systems 108A, 108B notably do not need to be positioned in close proximity to a given ground station in order to collect D-ATIS information. In some embodiments, collection system 108B sends a request message for D-ATIS information from ground station 104A, and collection system 108A sends a request message for D-ATIS information from ground station 104B. Both collection systems 108A and 108B may be located remotely from ground station 104A or ground station 104B. For example, ground station 104A may be located in Phoenix, Arizona, while ground station 104B may be located in Minneapolis, Minnesota. Collection systems 108A and 108B may be located in those cities, but may also be located in different cities, states, or countries from ground stations 104A, 104B. Collection systems 108A and 108B may also be located in different cities, states, or countries from each other.

In some embodiments, collection system 108A and collection system 108B can exchange data, such as D-ATIS parameters via communication link 130. Doing so can enable one collection system (e.g., collection system 104A) to send the D-ATIS parameters determined by another collection system (e.g., collection system 104B) to the central processing system if, for some reason (e.g., system fault or external interference), collection system 104B is not able to send its D-ATIS parameters to the central processing system directly.

Figure 2:
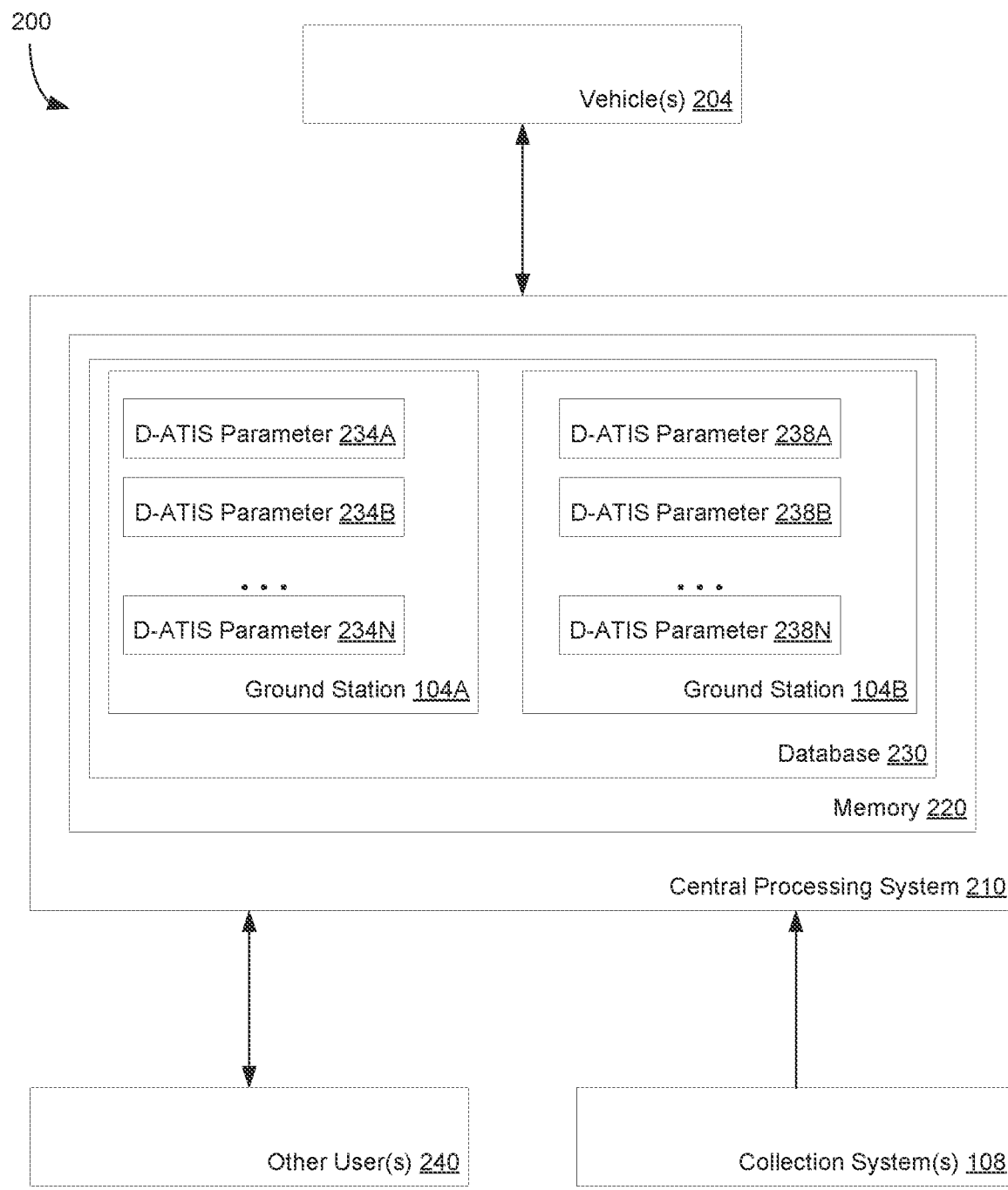
FIG. 2 depicts a block diagram of an exemplary system configured to manage D-ATIS parameters and to disseminate D-ATIS parameters to one or more vehicles, as described in one or more embodiments.

FIG. 2 depicts a block diagram of an exemplary system 200 configured to manage D-ATIS parameters and to disseminate D-ATIS parameters. System 200 includes a central processing system 210 communicatively coupled to one or more vehicles 204, one or more collection systems 108, and one or more other users 240. For simplified representation in the Figure, only one vehicle 204, collection system 108, and other user 240 is shown in FIG. 2; however, any positive number of vehicles 204, collection systems 108, and other users 240 can be communicatively coupled to central processing system 210.

Central processing system 210 includes one or more processors (not shown in FIG. 2) and a memory 220. The memory 220 includes a database 230 that stores the D-ATIS parameters for a plurality of ground stations 104A, 104B. In some embodiments, central processing system 210 is located remotely from collection system 108 and/or to vehicles 204. In some embodiments, central processing system 210 is implemented on a cloud server executed by one or more server computers configured to manage the server.

Initially, central processing system 210 is configured to populate the database 230 with D-ATIS parameters received from each of the collection systems 108 coupled to the central processing system. Central processing system 210 is configured to determine the D-ATIS parameters from a message received from the collection system 108. Referring to FIGS. 1-2, central processing system 210 receives a message that includes the D-ATIS parameters from collection system 108A for ground station 104A. Central processing system 210 is configured to extract each of the D-ATIS parameters from the received message and to store the extracted D-ATIS parameters in the database 230 corresponding to the ground station 104A. The message received from collection system 108A can include any number of D-ATIS parameters, such as first D-ATIS parameter 234A, second D-ATIS parameter 234B, and so on up to an N amount of D-ATIS parameters 234N. Each D-ATIS parameter 234N corresponds to a type of D-ATIS information originating from ground station 104A. Examples of D-ATIS parameters include environmental parameters such as weather conditions (temperature, dew point, humidity, inclement weather patterns), flight scheduling times for arrival/departures of aircraft, ground station location, available landing sites, and other parameters relevant for navigation near the ground station 104A. Central processing system 210 stores each D-ATIS parameter 234A-N in the database 230 for the ground station 104A.

Central processing system 210 additionally receives a message from collection system 108B with D-ATIS parameters that correspond to ground station 104B. Central processing system 210 is configured to extract the first D-ATIS parameter 238A, second D-ATIS parameter 238B, and each additional D-ATIS parameter 238N from the message, and to store each D-ATIS parameter 238A-N in database 230 for ground station 104B. Each time that central processing system 210 receives D-ATIS parameters for a ground station, central processing system 210 can repeat the process of extracting and storing the D-ATIS parameters in database 230. As new ground stations are added (for example, if a ground station begins broadcasting D-ATIS information), database 230 can be reorganized with the D-ATIS parameters for the new ground stations when they are received. In this way, central processing system 210 can manage the database 230 based on new or updated D-ATIS parameters.

In some embodiments, central processing system 210 receives D-ATIS parameters for a plurality of ground stations from one or more collection systems 108. That is, the collection systems 108 need not correlate to any specific ground station.

Once the database 230 is generated and stores D-ATIS parameters for a plurality of ground station, central processing system 210 acts a hub by which other entities can access the stored D-ATIS parameters regardless of their physical proximity to the ground stations or the geographical locations for which the D-ATIS parameters are collected from. For example, central processing system 210 can disseminate the stored D-ATIS parameters to one or more vehicles 204 requesting the D-ATIS parameters for uses such as flight monitoring or modification as the vehicle 204 is traversing to a destination, or for flight preparation for a vehicle before takeoff. Central processing system 210 is configured to receive a D-ATIS request message from vehicle 204 for D-ATIS parameters that correspond to one or more ground stations. For example, the D-ATIS request message can include a request for D-ATIS parameters corresponding to both ground station 104A and D-ATIS parameters corresponding to ground station 104B. In response, central processing system 210 generates a report message that includes the D-ATIS parameters 234A-N of ground station 104A and D-ATIS parameters 238A-N of ground station 104B and sends the message back to the requesting vehicle 204. Central processing system 210 can receive multiple D-ATIS report requests from each vehicle 204 that is communicatively coupled to the central processing system, and can disseminate requested D-ATIS parameters to the vehicles 204 accordingly.

Other users 240 may also request D-ATIS parameters from the central processing system 210. Other users 240 comprises processing systems, display systems, mobile devices, and other systems that may or may not be associated with a vehicle. An example of an "other user 240" is an offboard avionics device, which can independently request D-ATIS parameters outside of being on a vehicle 204 or connected to a CMS on a vehicle 204. When other user 240 requests D-ATIS parameters for a specified ground station, central processing system 210 is configured to generate a D-ATIS report message with the D-ATIS parameters that correspond to the ground station, and sends the message to other user 240.

In managing the dissemination and collection of D-ATIS parameters, central processing system 210 in some embodiments can restrict access to the D-ATIS parameters to only authenticated entities. When central processing system 210 receives a D-ATIS request message from either a vehicle 204 and/or other user 240, central processing system 210 can first determine whether the vehicle 204 and/or other user 240 is an entity that is allowed to access the stored D-ATIS parameters. If so, central processing system 210 can proceed as previously described, and disseminate the D-ATIS parameters for the requested ground station to the vehicle 204 and/or other user 240. Alternatively, central processing system 210 determines that the vehicle 204 and/or other user 240 is not a proper entity to access the stored D-ATIS parameters and does not disseminate the D-ATIS parameters to the vehicle 204 and/or other user 240. In some embodiments, central processing system 210 is configured to generate an alert to an operator of the central processing system of an attempted access from an unauthenticated entity.

Figure 3:
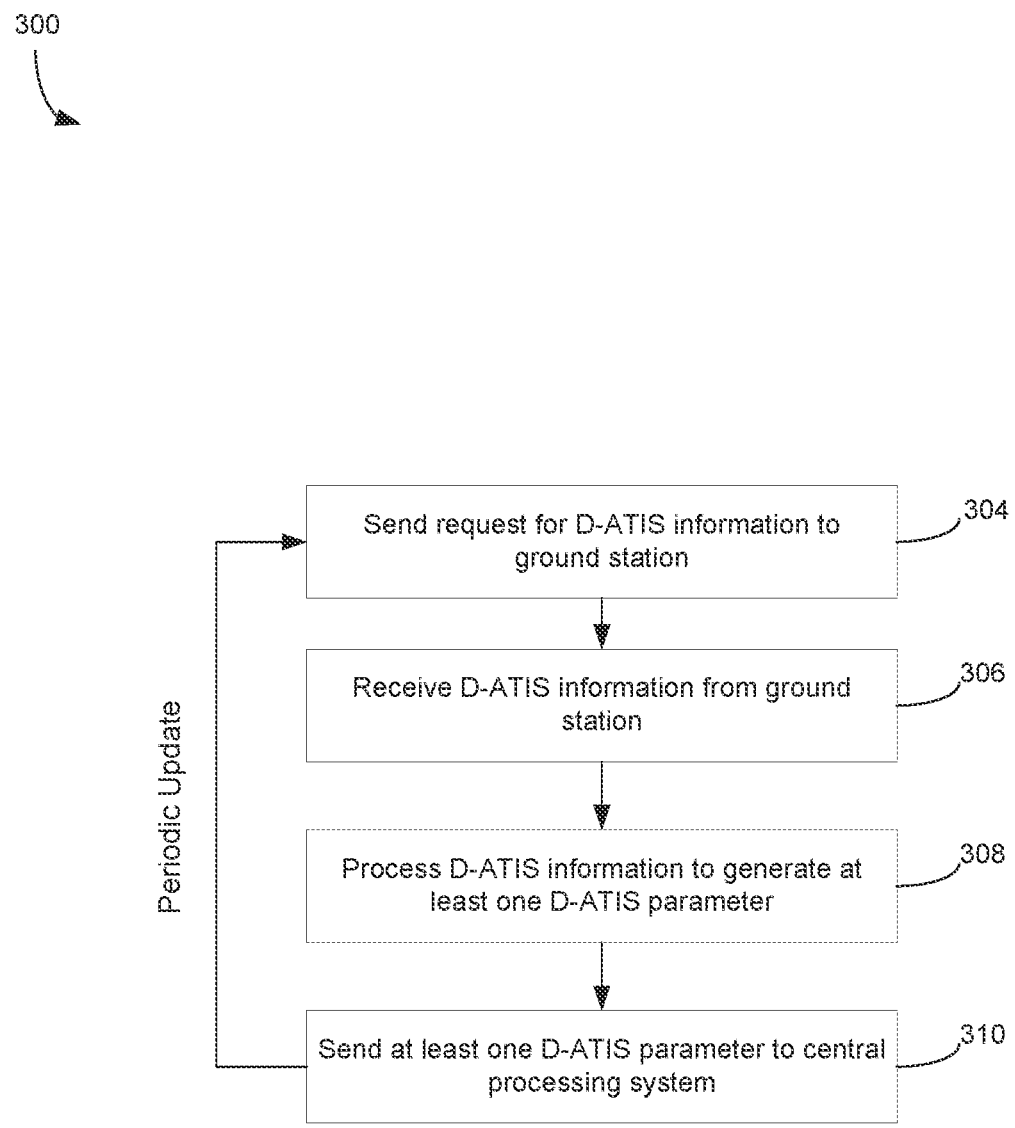
FIG. 3 depicts a flow diagram of an exemplary method for collecting D-ATIS information for a plurality of ground stations, as described in one or more embodiments.

FIG. 3 depicts a flow diagram of an exemplary method 300 for collecting D-ATIS information for a plurality of ground stations. The blocks of the flow diagram have been arranged in a generally sequential manner for ease of explanation; however, this arrangement is merely exemplary and the processing associated with method 300 and the other methods described herein (and the blocks shown in the Figures) may occur in a different order, for example, where at least some of the processing associated with the blocks is performed in parallel and/or in an event-driven manner. Also, most standard exception handling is not described for ease of explanation; however, method 300 can and typically would include such exception handling. Method 300 is performed by each collection system 108 described in FIGS. 1-2.

At block 304, method 300 includes sending a request for D-ATIS information to a ground station. This step can be performed for each deployed collection system, so that each respective collection system sends a request to at least one ground station. Each collection system may correspond to a particular ground station (so that the collection system only sends a request to its respective ground station), but one or more collection systems can also send requests to multiple ground stations regardless of proximity to a ground station. In some embodiments, the request can be sent via a datalink communications protocol, such as by an ACARS message sent by a SATCOM communication link to the ground station.

At block 306, method 300 includes receiving D-ATIS information from the ground station that in response to the request message. This step can be performed for each deployed collection system, resulting in D-ATIS information for each of the plurality of ground stations located in different geographical locations. In some embodiments, the D-ATIS information can be received via a datalink communications protocol, such as by an ACARS message sent by a SATCOM communication link from the ground station.

At block 308, method 300 includes processing the D-ATIS information received from the ground station to generate at least one D-ATIS parameter. This step can be performed for each deployed collection system. Each at least one D-ATIS parameter corresponds to the respective ground station. In some embodiments, the at least one D-ATIS parameter will include a plurality of D-ATIS parameters that correspond to a given ground station, which can otherwise be referred to as a "set of D-ATIS parameters".

At block 310, method 300 includes sending the at least one D-ATIS parameter to the central processing system. This step is performed for each collection system deployed in a respective geographical location. That is, each collection system can send a respective at least one D-ATIS parameter (or in the case of multiple parameters, a respective set of D-ATIS parameters) to the central processing system. Method 300 optionally reverts back to block 304, in which each collection system sends another request for D-ATIS information from its associated ground station. The process of collecting D-ATIS information and sending D-ATIS parameters to central processing system can then be repeated for each periodic update.

Figure 4:
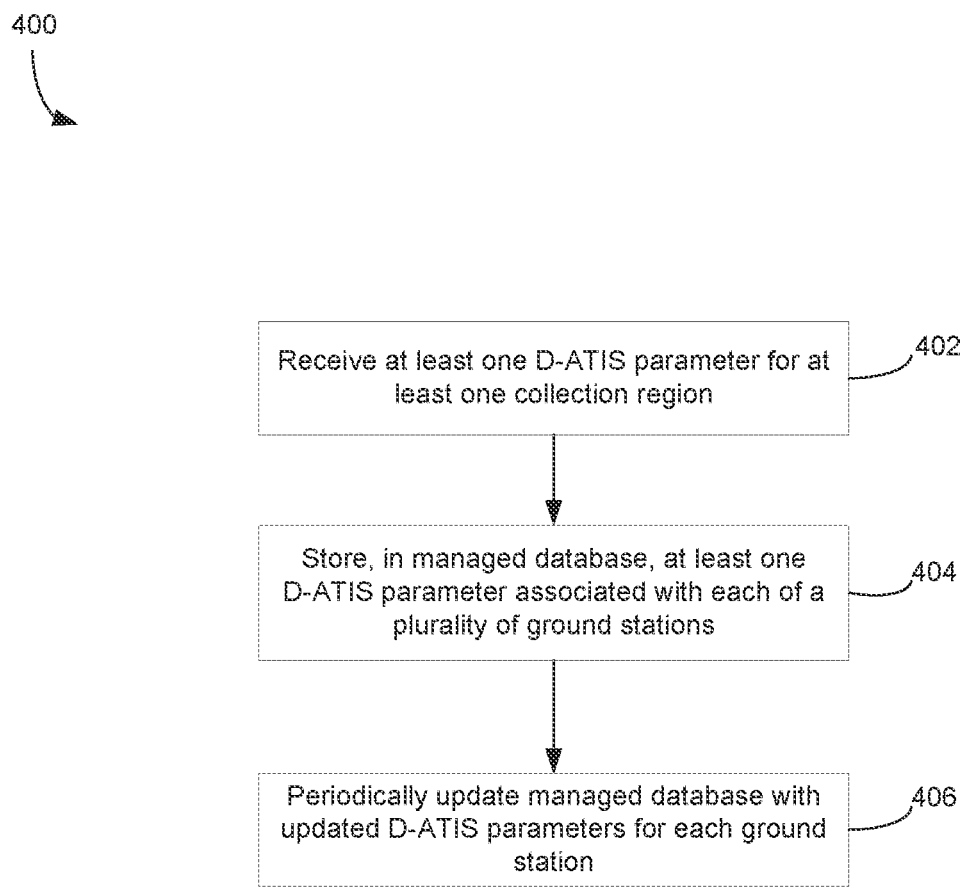
FIG. 4 depicts a flow diagram of an exemplary method for managing D-ATIS information received for a plurality of ground stations, as described in one or more embodiments.

FIG. 4 depicts a flow diagram of an exemplary method 400 for managing D-ATIS information received for a plurality of ground stations. Method 400 is performed by the central processing system 210 described in FIG. 2 in conjunction with the collection techniques performed by the collection systems 108 described in FIGS. 1-2 and the collection method of FIG. 3.

Method 400 includes receiving at least one D-ATIS parameter for at least one ground station from at least one collection system at block 402. The D-ATIS parameters can be received by a message that is sent from each collection system to the central processing system. In some embodiments, receiving the D-ATIS parameters comprises extracting the D-ATIS parameters from the message sent by each collection system.

At block 404, method 400 includes storing the at least one D-ATIS parameter received from each collection system in database managed by the central processing system. In some embodiments, the central processing system is configured to determine the ground station that corresponds to the D-ATIS parameters sent by one of the collection systems, and to store the D-ATIS parameters in the managed database based on the ground station.

At block 406, method 400 includes periodically updating the managed database with updated D-ATIS parameters. As the central processing system receives new D-ATIS parameters from one or more of the collection systems, it can update the database with the new information so that the D-ATIS parameters for a ground station correspond to the most recent D-ATIS information that is available for that ground station. In some embodiments, the central processing system 210 may store both the most recent D-ATIS parameters as well as historical D-ATIS parameters for a ground station. The D-ATIS parameters stored for a ground station can be organized or otherwise indicated on the basis of the timestamp associated with the D-ATIS parameters, where the timestamp is indicative of when the D-ATIS parameters were determined from the D-ATIS report.

Figure 5:
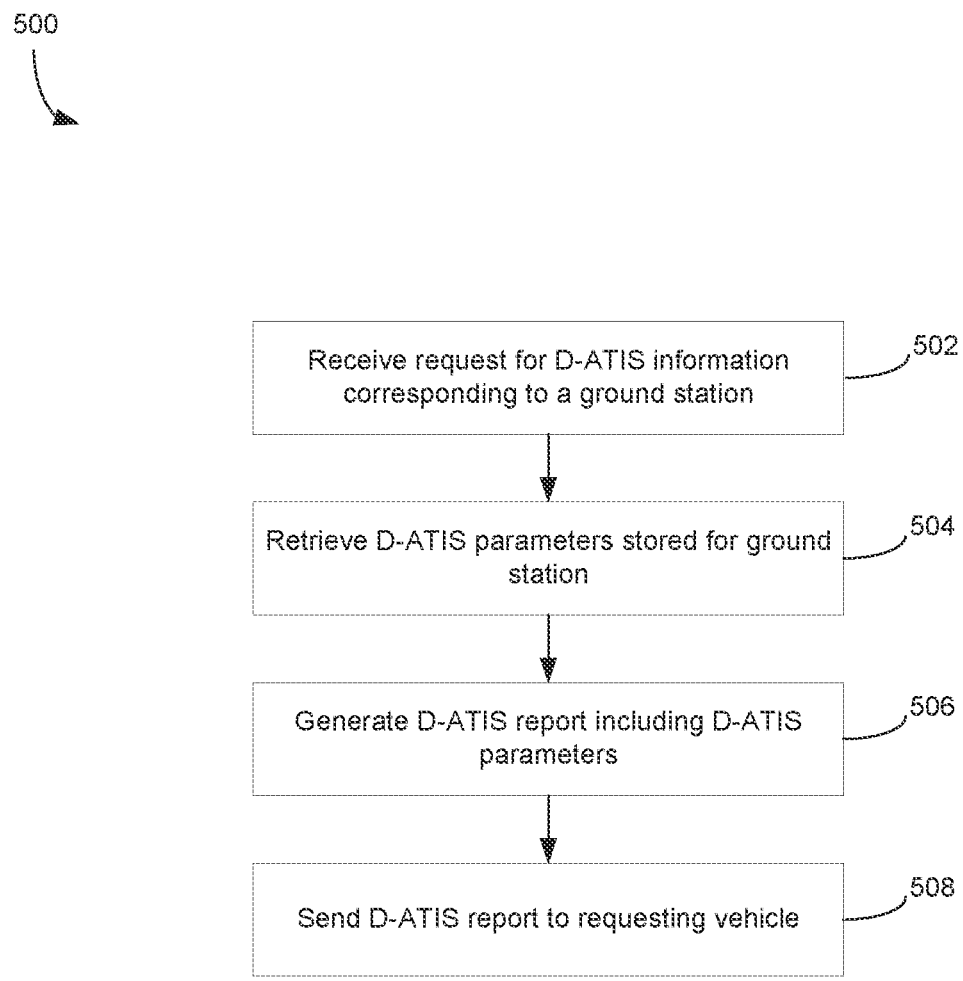
FIG. 5 depicts a flow diagram of an exemplary method for disseminating D-ATIS parameters to one or more vehicles in a communication network, as described in one or more embodiments.

FIG. 5 depicts a flow diagram of an exemplary method for disseminating D-ATIS parameters to one or more vehicles in a communication network. Method 500 is performed by the central processing system 210 in conjunction with one or more vehicles 204 and other users 240 communicatively coupled to the central processing system.

Method 500 includes, at block 502, receiving a request for D-ATIS information corresponding to a ground station managed by the central processing system 210. The request can be received from a vehicle 204 or other user 240 such as an avionics device. Both the vehicle 204 and other user 240 can be remotely located from the central processing system 210 and the ground station for which it requests D-ATIS information. The central processing system 210 can receive multiple such requests from each vehicle 204 or other user 240 in the network.

At block 504, method 500 includes retrieving D-ATIS parameters stored in the database managed by the central processing system 210 that correspond to the requested ground station(s). The ground stations can be requested by entities such as a vehicle 204 or other user 240 as described in FIG. 2. In some embodiments, central processing system 210 can first determine whether the vehicle (or other user 240) that requested the D-ATIS information is authorized to receive the D-ATIS parameters stored in the database. If so, then the central processing system 210 retrieves the D-ATIS parameters for each of the ground stations requested.

At block 506, method 500 includes generating a D-ATIS report that includes the D-ATIS parameters that correspond to the ground station(s) in the request. In some embodiments, the D-ATIS report will be presented in a format that would be similar to a D-ATIS message that would be sent by the ground station.

At block 508, method 500 includes sending the D-ATIS report to the requesting vehicle (or other user). In some embodiments, the D-ATIS report is sent using an ACARS protocol message via a SATCOM link. The central processing system can repeat each of the steps of method 500 as new requests are received.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application-specific integrated circuits (ASICs).

EXAMPLE EMBODIMENTS

Example 1 includes a method, comprising: receiving a request for Digital Automatic Terminal Information Service (D-ATIS) information that corresponds to at least one ground station; retrieving, from a database managed by a central processing system, one or more stored D-ATIS parameters that correspond to the at least one ground station, wherein the central processing system is configured to store D-ATIS parameters corresponding to a plurality of ground stations; generating a D-ATIS report that includes the D-ATIS parameters that correspond to the at least one ground station; and sending the D-ATIS report to a vehicle or other user that generated the request.

Example 2 includes the method of Example 1, wherein the D-ATIS parameters stored in the database are generated by: sending, by at least one collection system, a request for the D-ATIS information to the at least one ground station; receiving the D-ATIS information from the at least one ground station in response to sending the request for the D-ATIS information; processing the D-ATIS information to generate at least one D-ATIS parameter, wherein the at least one D-ATIS parameter corresponds to the at least one ground station; and sending the at least one D-ATIS parameter to the central processing system.

Example 3 includes the method of Example 2, wherein the at least one collection system is configured to receive the D-ATIS information from the at least one ground station remotely.

Example 4 includes the method of any of Examples 2-3, comprising sending at least one updated D-ATIS parameter corresponding to the at least one ground station to the central processing system in response to receiving the at least one updated D-ATIS parameter from the at least one ground station.

Example 5 includes the method of any of Examples 2-4, wherein sending, by the at least one collection system, a request for the D-ATIS information to the at least one ground station comprises sending an Aircraft Communications Addressing and Reporting System (ACARS) message via a satellite communications (SATCOM) communication link to the at least one ground station.

Example 6 includes the method of any of Examples 1-5, wherein the database includes historical D-ATIS parameters corresponding to the at least one ground station.

Example 7 includes the method of any of Examples 1-6, wherein the at least one D-ATIS parameter includes at least one of: environmental parameters, an identity of the at least one ground station, scheduled times for arrival or departure, and/or available landing sites at the at least one ground station.

Example 8 includes a system, comprising: a central processing system comprising at least one processor and a memory; wherein the central processing system is configured to manage a database storing Digital Automated Terminal Information Service (D-ATIS) parameters that correspond to a plurality of ground stations; and wherein the central processing system is configured to: receive a request for D-ATIS information that corresponds to at least one ground station from at least one vehicle or other user communicatively coupled to the central processing system; retrieve one or more of the stored D-ATIS parameters that correspond to the at least one ground station; generate a D-ATIS report that includes the D-ATIS parameters that correspond to the at least one ground station; and send the D-ATIS report to the at least one vehicle or other user that sent the request.

Example 9 includes the system of Example 8, further comprising at least one collection system communicatively coupled to the central processing system, wherein the at least one collection system is configured to: send a request for the D-ATIS information to the at least one ground station; receive the D-ATIS information from the at least one ground station in response to sending the request for the D-ATIS information; process the D-ATIS information to generate the at least one D-ATIS parameter, wherein the at least one D-ATIS parameter corresponds to the at least one ground station; and send the at least one D-ATIS parameter to the central processing system.

Example 10 includes the system of Example 9, wherein the at least one collection system is configured to receive the D-ATIS information from the at least one ground station remotely.

Example 11 includes the system of any of Examples 9-10, wherein the at least one collection system is configured to send at least one updated D-ATIS parameter corresponding to the at least one ground station to the central processing system in response to receiving the at least one updated D-ATIS parameter from the at least one ground station.

Example 12 includes the system of any of Examples 9-11, wherein the at least one collection system is configured to send the request for D-ATIS information to the at least one ground station as an Aircraft Communications Addressing and Reporting System (ACARS) message via a satellite communications (SATCOM) communication link to the at least one ground station.

Example 13 includes the system of any of Examples 8-12, wherein the at least one D-ATIS parameter includes environmental parameters, an identity of the at least one ground station, scheduled times for arrival or departure, and/or available landing sites at the at least one ground station.

Example 14 includes a program product comprising a non-transitory processor-readable medium on which program instructions configured to be executed by at least one processor are embodied, wherein when executed by the at least one processor, the program instructions cause the at least one processor to: receive a request for Digital Automatic Terminal Information Service (D-ATIS) information that corresponds to at least one ground station; retrieve, from a database managed by a central processing system, one or more stored D-ATIS parameters that correspond to the at least one ground station, wherein the central processing system is configured to store D-ATIS parameters corresponding to a plurality of ground stations; generate a D-ATIS report that includes the D-ATIS parameters that correspond to the at least one ground station; and send the D-ATIS report to a vehicle or other user that generated the request.

Example 15 includes the program product of Example 14, wherein the program instructions further cause the at least one processor to: send a request for the D-ATIS information to the at least one ground station; receive the D-ATIS information from the at least one ground station in response to sending the request for the D-ATIS information; process the D-ATIS information to generate at least one D-ATIS parameter, wherein the at least one D-ATIS parameter corresponds to the at least one ground station; and send the at least one D-ATIS parameter to the central processing system.

Example 16 includes the program product of Example 15, wherein the program instructions cause the at least one processor to receive the D-ATIS information from the at least one ground station remotely.

Example 17 includes the program product of any of Examples 15-16, wherein the program instructions cause the at least one processor to send at least one updated D-ATIS parameter corresponding to the at least one ground station to the central processing system in response to receiving the at least one updated D-ATIS parameter from the at least one ground station.

Example 18 includes the program product of any of Examples 15-17, wherein the program instructions cause the at least one processor to send an Aircraft Communications Addressing and Reporting System (ACARS) message via a satellite communications (SATCOM) communication link to the at least one ground station.

Example 19 includes the program product of any of Examples 14-18, wherein the at least one D-ATIS parameter includes at least one of: environmental parameters, an identity of the at least one ground station, scheduled times for arrival or departure, and/or available landing sites at the at least one ground station.

Example 20 includes the program product of any of Examples 14-19, wherein the program instructions cause the at least one processor to: determine whether the request is from an authorized entity; and send the D-ATIS report to the at least one vehicle or other user in response to determining that the request is from an authorized entity.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
   receiving, by a central processing system from a vehicle or other user a request for Digital Automatic Terminal Information Service (D-ATIS) information that corresponds to at least one ground station, wherein the central processing system is located remotely from the vehicle or other user and is configured to manage a database storing D-ATIS parameters that correspond to a plurality of ground stations;
   retrieving, from the database managed by a central processing system, one or more of the stored D-ATIS parameters that correspond to the at least one ground station;
   generating a D-ATIS report that includes the D-ATIS parameters that correspond to the at least one ground station; and
   sending the D-ATIS report to the vehicle or other user that generated the request, wherein the vehicle is controlled at least in part based on the D-ATIS parameters of the D-ATIS report, further wherein the D-ATIS parameters stored in the database are generated by:
      sending by at least one collection system a request for the D-ATIS information to the at least one ground station, wherein the at least one collection system simulates a navigating aircraft requesting D-ATIS information to the at least one ground station;
      receiving the D-ATIS information from the at least one ground station in response to sending the request for the D-ATIS information;
      processing by a communications management system of the collection system the D-ATIS information to generate at least one D-ATIS parameter, wherein the at least one D-ATIS parameter corresponds to the at least one ground station; and
      sending the at least one D-ATIS parameter to the central processing system.

2. The method of claim 1, wherein the at least one collection system is configured to receive the D-ATIS information from the at least one ground station remotely.

3. The method of claim 1, comprising sending at least one updated D-ATIS parameter corresponding to the at least one ground station to the central processing system in response to receiving the at least one updated D-ATIS parameter from the at least one ground station.

4. The method of claim 1, wherein sending, by the at least one collection system, a request for the D-ATIS information to the at least one ground station comprises sending an Aircraft Communications Addressing and Reporting System (ACARS) message via a satellite communications (SAT-COM) communication link to the at least one ground station.

5. The method of claim 1, wherein the database includes historical D-ATIS parameters corresponding to the at least one ground station.

6. The method of claim 1, wherein the at least one D-ATIS parameter includes at least one of: environmental parameters, an identity of the at least one ground station, scheduled times for arrival or departure, and/or available landing sites at the at least one ground station.

7. A system, comprising:
   a central processing system located remotely from the vehicle or other user and comprising at least one processor and a memory; wherein the central processing system is configured to manage a database storing Digital Automated Terminal Information Service (D-ATIS) parameters that correspond to a plurality of ground stations; and wherein the central processing system is configured to:
      receive a request for D-ATIS information that corresponds to at least one ground station from the at least one vehicle or other user communicatively coupled to the central processing system;
      retrieve one or more of the stored D-ATIS parameters that correspond to the at least one ground station;
      generate a D-ATIS report that includes the D-ATIS parameters that correspond to the at least one ground station;
      send the D-ATIS report to the at least one vehicle or other user that sent the request, wherein the at least one vehicle is controlled at least in part based on the D-ATIS parameters of the D-ATIS report; and
   at least one collection system communicatively coupled to the central processing system, wherein the at least one collection system is configured to:
      send a request for the D-ATIS information to the at least one ground station, wherein the at least one collection system is configured to simulate a navigating aircraft requesting D-ATIS information to the at least one ground station;
      receive the D-ATIS information from the at least one ground station in response to sending the request for the D-ATIS information;
      process the D-ATIS information to generate the at least one D-ATIS parameter, wherein the at least one D-ATIS parameter corresponds to the at least one ground station; and
      send the at least one D-ATIS parameter to the central processing system.

8. The system of claim 7, wherein the at least one collection system is configured to receive the D-ATIS information from the at least one ground station remotely.

9. The system of claim 7, wherein the at least one collection system is configured to send at least one updated D-ATIS parameter corresponding to the at least one ground station to the central processing system in response to receiving the at least one updated D-ATIS parameter from the at least one ground station.

10. The system of claim 7, wherein the at least one collection system is configured to send the request for D-ATIS information to the at least one ground station as an Aircraft Communications Addressing and Reporting System (ACARS) message via a satellite communications (SAT-COM) communication link to the at least one ground station.

11. The system of claim 7, wherein the at least one D-ATIS parameter includes environmental parameters, an identity of the at least one ground station, scheduled times for arrival or departure, and/or available landing sites at the at least one ground station.

12. A program product comprising a non-transitory processor-readable medium on which program instructions configured to be executed by at least one processor are embodied, wherein when executed by the at least one processor, the program instructions cause the at least one processor to:

receive, by a central processing system from a vehicle or other user a request for Digital Automatic Terminal Information Service (D-ATIS) information that corresponds to at least one ground station, wherein the central processing system is located remotely from the vehicle or other user and is configured to manage a database storing D-ATS parameters that correspond to a plurality of ground stations;

retrieve, from the database managed by a central processing system, one or more stored D-ATIS parameters that correspond to the at least one ground station;

generate a D-ATIS report that includes the D-ATIS parameters that correspond to the at least one ground station;

send the D-ATIS report to a vehicle or other user that generated the request wherein the vehicle is controlled at least in part based on the D-ATIS parameters of the D-ATIS report;

wherein the program instructions further cause the at least one processor to:
  send a request for the D-ATIS information to the at least one ground station, wherein the at least one collection system simulates a navigating aircraft requesting D-ATIS information to the at least one ground station;
  receive the D-ATIS information from the at least one ground station in response to sending the request for the D-ATIS information;
  process by a communication management system of the collection system the D-ATIS information to generate at least one D-ATIS parameter, wherein the at least one D-ATIS parameter corresponds to the at least one ground station; and
  send the at least one D-ATIS parameter to the central processing system.

13. The program product of claim 12, wherein the program instructions cause the at least one processor to receive the D-ATIS information from the at least one ground station remotely.

14. The program product of claim 12, wherein the program instructions cause the at least one processor to send at least one updated D-ATIS parameter corresponding to the at least one ground station to the central processing system in response to receiving the at least one updated D-ATIS parameter from the at least one ground station.

15. The program product of claim 12, wherein the program instructions cause the at least one processor to send an Aircraft Communications Addressing and Reporting System (ACARS) message via a satellite communications (SATCOM) communication link to the at least one ground station.

16. The program product of claim 12, wherein the at least one D-ATIS parameter includes at least one of: environmental parameters, an identity of the at least one ground station, scheduled times for arrival or departure, and/or available landing sites at the at least one ground station.

17. The program product of claim 12, wherein the program instructions cause the at least one processor to:
  determine whether the request is from an authorized entity; and
  send the D-ATIS report to the at least one vehicle or other user in response to determining that the request is from an authorized entity.

* * * * *